United States Patent [19]
Kaaden et al.

[11] Patent Number: 5,644,675
[45] Date of Patent: Jul. 1, 1997

[54] METHOD OF HELICAL SCAN MAGNETIC TAPE RECORDING

[75] Inventors: Jürgen Kaaden, Villingen-Schwenningen; Gerhard Reiner, Schonbach; Peter Mahr, Königsfeld, all of Germany

[73] Assignee: Deutsche Thomson-Brandt GmbH, Villingen-Schwenningen, Germany

[21] Appl. No.: 410,417

[22] Filed: Mar. 27, 1995

Related U.S. Application Data

[63] Continuation of Ser. No. 164,248, Dec. 9, 1993, abandoned.

[30] Foreign Application Priority Data

Dec. 12, 1992 [DE] Germany .................. 42 41 986.7

[51] Int. Cl.$^6$ .................................................. G11B 27/32
[52] U.S. Cl. ........................ 386/60; 360/72.2; 386/65
[58] Field of Search ............................ 360/72.2, 14.3; 386/60, 62, 65

[56] References Cited

U.S. PATENT DOCUMENTS

| | | | |
|---|---|---|---|
| 3,681,524 | 8/1972 | Nicholls | 360/72.2 |
| 4,142,209 | 2/1979 | Hedlund et al. | 360/77 X |
| 4,516,164 | 5/1985 | Moxon | 360/53 |
| 4,663,678 | 5/1987 | Blum | 360/72.2 |
| 4,665,431 | 5/1987 | Cooper | 358/143 X |
| 4,788,607 | 11/1988 | Sekiguchi et al. | 360/14.3 X |

FOREIGN PATENT DOCUMENTS 2131996 6/1984 United Kingdom .

OTHER PUBLICATIONS

Communication Systems: Carlson: McGraw-Hill © 1968, pp. 296-299.

Primary Examiner—Aristotelis Psitos
Assistant Examiner—James T. Wilson
Attorney, Agent, or Firm—Joseph S. Tripoli; Joseph J. Laks; Francis A. Davenport

[57] ABSTRACT

A time coding system of high resolution for a digital audio and video recording system is disclosed. Various methods of structuring: time code for recording are disclosed which enable time code reading at high tape transport speeds to facilitate automatic search/forward and reverse. A time and control code generator for video recording and replay use comprises a pulse generator generating a pulse having a television frame frequency repetition rate. A source of a time code signal is related to the television frame frequency, and comprises data bits representing hours minutes seconds and frames. A pulse position modulation means is coupled to the pulse and in response to the data its representing hours minutes seconds, modulates a trailing edge of the pulse to a first position responsive to the data bits having a logical 1 value and modulates the trailing edge to a second position responsive to the data bits having a logical 0 value. A generating is means coupled to the data bits representing frames and generates a first signal frequency responsive to the frame data bits having a logical 0 value and a second signal frequency responsive to the frame data bits having a logical 1 value. The second frequency is double the first frequency. The first and second frequencies are added symmetrically to the trailing edge to maintain the modulated positions.

15 Claims, 5 Drawing Sheets

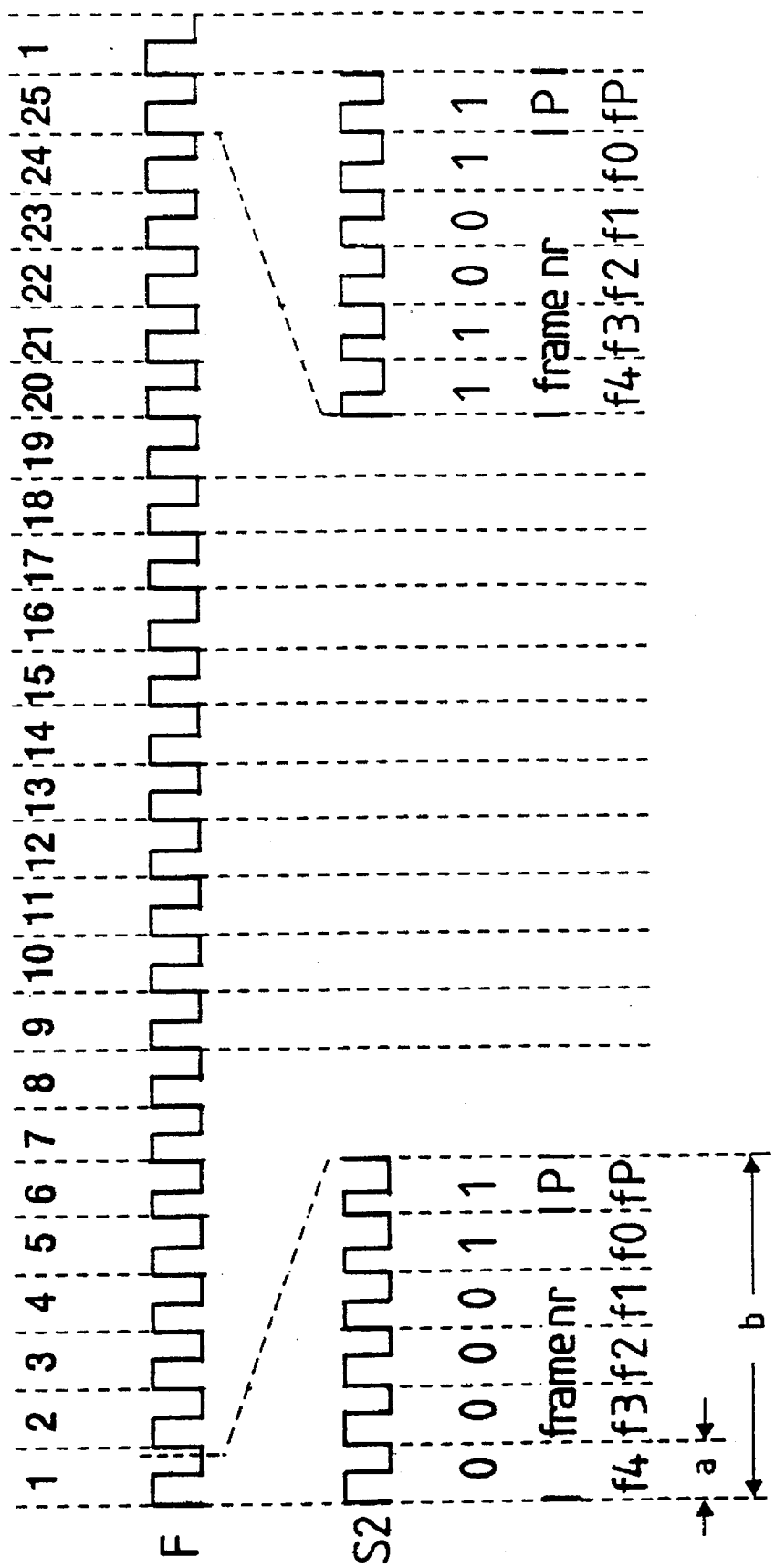
Fig.2
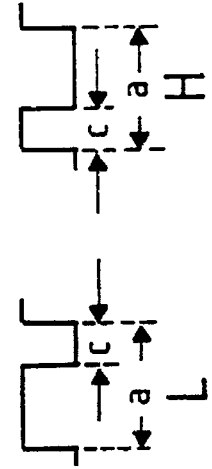

METHOD OF HELICAL SCAN MAGNETIC TAPE RECORDING

This application is a continuation of application Ser. No. 08/164,248, filed Dec. 9, 1993, now abandoned.

This invention relates to the field of helically scanned magnetic tape recording, and in particular to a time and control code for use therein.

BACKGROUND OF THE INVENTION

In VHS recording equipment, a control track signal is recorded on a longitudinal track at the lower edge of the tape. In 50 Hz TV systems the control track signal has a period of 40 mS. The control track signal may be counted and interpreted as time information. However, such a method requires that the recorded tape be wound to the start of the recording in order to determine the time of a recorded occurrence.

A VHS Control Track Longitudinal CTL System was introduced in 1986. This system allows one bit to be transmitted every 40 mS by a variation in time of the previously unused trailing edge of the control track servo synchronising signal. Thus a time recording is provided where a complete data word is made available every 2 seconds. However, the system has a resolution of 2 seconds and the relative coding of the frame pulses is disadvantageous.

In professional equipment, an IEC 461 standard for time code has proved effective. The standard provides a Longitudinal Time Code or LTC track which has a resolution of 500 µs/bit. The standard permits items of time code and other information to be multiplexed into both a longitudinal track and a helical scanned track. However, high tape transport speeds prevents the recovery of the absolute time code values.

An object of the invention is to establish a time coding system of high resolution for a digital audio and video recording system. The time coding system will facilitate reading time code at high tape transport speeds, for example during automatic search/forward and reverse.

SUMMARY OF THE INVENTION

A time and control code generator for video recording a replay use, said generator comprises a pulse generator generating a pulse having a television frame frequency repetition rate. A source of a time code signal is related to said television frame frequency, and comprises data bits representing hours minutes seconds and frames. A time and control code generator for video recording and replay use, the generator comprises a pulse generator generating a waveform of pulses having a television frame frequency repetition rate. A source of a time code signal related to the television frame frequency repetition rate and comprises data bits representative of hours, minutes and seconds of time and data bits representative of frames. A pulse width modulating means is responsive to the time representative data bits for moving trailing edges of the pulses to a first position when the time representative data bits have a first logical value and to a second position when the time representative data bits have a second logical value. A signal generating means is responsive to the frame representative data bits and generates a signal having a first frequency when the frame representative data bits have the first logical value and having a second frequency when the frame representative data bits have the second logical value. The signals of the first and second frequencies are added to the width modulated signal to occur with symmetrical positions about the trailing edges of the width modulated pulses. The modulated positions of the trailing edges are undisturbed by the symmetrical positions.

BRIEF DESCRIPTION OF THE DRAWING

FIG. 2 shows a recorded track signal S2 according to the first inventive solution.

DETAILED DESCRIPTION

In the recording method in accordance with the invention, a longitudinal track recording is used wherein the trailing edge modulation for the phase reference pulses on the synchronising track is not possible because of their large resolution requirements and the high frequency thereby entailed. The recording method in accordance with the invention is intended to manage with one or two additional longitudinal tracks in dependence on the constructional stage. The time code information that is to be recorded is divided into two portions. One portion contains the relevant values such as hours/minutes/seconds (h/m/s). This portion is recorded in a first track with a bit separation that can also be read at high tape speeds. The second portion contains the frame count information and is either recorded in a separate track (Solution 1) or else is multiplexed into the signal of the first track by frequency division (Solution 2).

Figure 1:
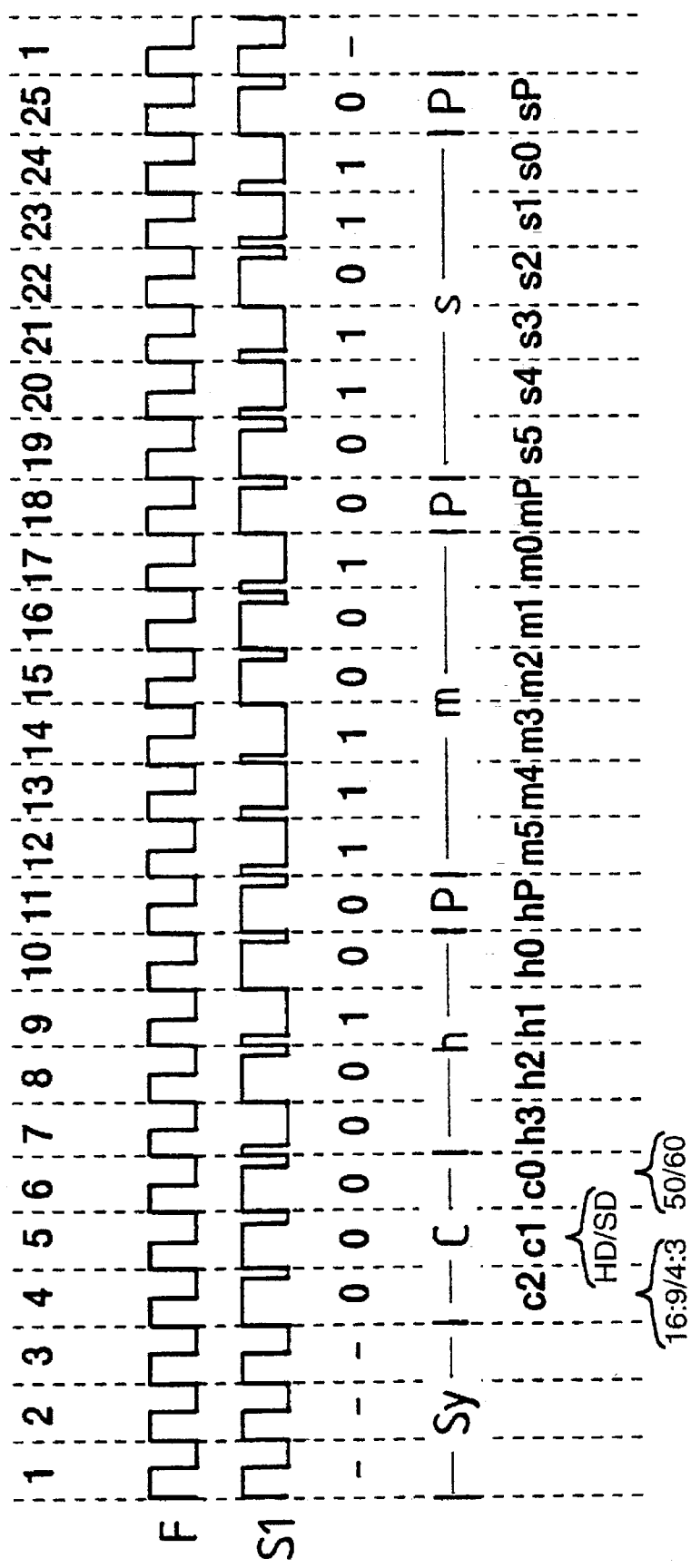
FIG. 1 shows a recorded track signal S1 according to a first inventive solution.

In a first inventive solution, the signal of the track 1 (hereinafter referred to as S1), as shown in FIG. 1, contains one information bit every 40 mS. Each frame signal identifies a self-contained region of the data recorded in the helical tracks. The frame signal is supplied to the servo system of the video signal processing means, has a time duration of 40 mS and is used for servo synchronisation. Thus, a period of 25 frame pulses only covers the time span of one second. The recorded signal of the first three frame pulses has a symmetrical rectangular sequence with a pulse to pause ratio of exactly 50% and is used for synchronisation. The subsequent data bits are width modulated where a pulse/pause ratio of 25% represents an H, high or logical 1 data bit and 75% represents a L, low or logical 0 data bit. The evaluation or decoding method for signal S1 employs counting stages which increment during the H, high or logical 1 state of the input signal and decrement during the L, low or logical 0 state. The counter reading or value is stored for each positive edge, thereafter, the counter is reset. The count value is tested for values of 0, indicating a synchronising bit, a positive value indicating an H, high or logical 1 bit, and a negative value indicating a L, low or logical 0 bit.

Following the synchronizing bits there are three control bits c0, c1, c2, which represent items of control information for the whole system. For example: the number of tracks/frame, dependent on the mains or vertical frequency 50/60 Hz, the picture aspect ratio (16:9 or 4:3) and whether HD (High Definition) or SD (Standard Definition) signals were used for the recording. Alternative use of these bits in various combinations having $2^3=8$ possible states is also possible. An arrangement of the control bits could appear as follows 011 Long-play, HD, 16:9, 50 Hz.

Following the control bits the next 19 bits carry, in groups, the information regarding the hours (4 bit), minutes (6 bit) and seconds (6 bit), respectively counted in binary, and each being protected by a parity bit (even parity) per group. The described sequence of 25 bits is recorded once each second.

The signal of the track 2 (hereinafter referred to as signal S2) comprises a pattern for each frame pulse. For each of the 25 frame pulses portrayed, there exists a pattern of 6 bits which starts synchronously with each frame pulse of S1 and ends within the frame pulse interval, as shown in FIG. 2. The first 5 bits of the pattern comprises the count information for the frame number, the sixth bit serves for parity checking. The logical states are characterised by the pulse to pause ratio of the individual bits where an H, high or logical 1 bit corresponds to 33% and a L, low or logical 0 bit is represented by 66%. The pulse to pause values 25%, 50%, 75% have been selected for the S1 signal and 33%, 66%, for the S2 signal in order to be able to generate all of the signals from a single clock.

The information from track 1 serves for the synchronising (counter reading association) of both tracks and carries the time count values of lower resolution (h/m/s). Thus, it is always required. Track 2 carries a dependent, high resolution time information whose timely occurrences take place in synchronism with changes in the track 1.

In a second inventive solution, all of the items of information are recorded in one track. Signals of different weighting or significance are recorded as different frequencies. In the fast forward mode, it is not useful to determine frame numbers which cannot be displayed in the indicator due to their high repetition rate. Preferably, a high frequency signal is used for the fine resolution information such as frame numbers and a low frequency signal is employed for the normal resolution (h/m/s). These signals may be recorded one after the other in one track. The previously described S1 signal is used as the base band signal having a low frequency however, the falling edge of each S1 pulse signal is displaced in time by a sequence of 6 bits, as shown in waveform S2 of FIG. 3. Three of the 6 bits are inserted ahead of the falling edge position with the remaining 3 bits being inserted after the nominal edge position. Thus the 6 bits are symmetrically located about the falling of the S1 pulse signal. In addition the sequence of the first respectively 3 bits is symmetrically inserted after the edge. Each of these 6 bits may comprise of one of two trains of oscillations or frequencies having a pulse to pause ratio of 50%. This ensures that the amplitude reduction for positive and negative pulses of a bit is constant during rewind operation, which simplifies the evaluation or decoding circuitry. The bit length for H or logical 1 bits and L or logical 0 bits is the same which ensures that the length of the analysis window is constant for all of the bits. The maximum bit length results from the permissible displacement of the low frequency time code signal S1. A value of +/−3 mS will enable a clean identification even during the re-wind operation. To assist in recognition of the synchronizing bits Sy, occurring at frames 1–3, the multiplexing of time codes is omitted from the trailing edges of these pulses. The frame counter counts on normally but the trailing edges of the preamble pulses are not modulated in time. The multiplexing of the highly resolved time code information is resumed with the first control bit c0.

The first inventive solution represents an optimal cost solution to the problem of time codes. With the choice of Solution 1, after the insertion of the cassette, it can be immediately recognised in the automatic search mode in which direction the tape has to be moved in order to be able to read and display the complete time information as quickly as possible. Thereafter, the system returns to the start of the frame which was first detected when the cassette was, inserted.

In the second inventive solution, the automatic search mode is provided up to a search speed of 3 times as a result of the absence of data during the preamble or sync pulse signal. On the other hand, the Solution 2 excels due to its high cost efficiency since only the recording and reproduction electronics for one channel has to be available and only one head is needed. The system is very robust due to the availability of a larger track width (VHS single audio track 1 mm, stereo track each of 0.35 mm). In the second inventive solution during the re-wind operation, the fine resolution is dispensed with completely and the data items are evaluated from S1 signal. The second inventive solution incorporates the de-activation automatically since, at greater tape shuttle speeds, the multiplexed higher frequency components are so highly damped by the whole reproduction system that a digital time signal can no longer be derived from them. A separation in time of the groups is carried out since the items of time code information are recorded successively.

FIG. 1 shows the signal of the recorded track S1. The signal of the track S1 contains one bit of information every 40 mS. Each frame signal F represents a self-contained region of the data items recorded in the helical tracks. The illustrated sequence of 25 frame pulses F thus covers the time span of 1 second. The recorded signal Sy of the first three frame pulses F, is provided for synchronization and comprises a symmetrical rectangular sequence having a pulse to pause ratio of exactly 50%.

Three control bits C, which represent items of control information for the whole system follow the synchronising bits where bit c0 indicates mains frequency 50/60 Hz, bit c1 indicates the picture aspect ratio 16:9 or 4:3 and bit c2 indicates whether HD or SD signals were used for the recording.

After the three control bits the following 19 bits carry, in groups, the information regarding the hours h (4 bit), minutes m (6 bit) and seconds s (6 bit), respectively counted in binary, and each being protected by a parity bit P (even parity) per group. The described sequence of 25 bits, shown in FIG. 1, is recorded once each second.

The succeeding data bits of the frame pulses F4 to F25 are characterised by a pulse/pause ratio of 25% in the case of a H bit and 75% in the case of an L bit.

FIG. 2 shows the recorded track signal S2 according to the first inventive solution. For each of the 25 frame pulses portrayed, there exists a pattern of 6 bits which starts synchronously with each frame information of S1 and is contained within a frame interval. In frame number F1, the first 5 bits of the pattern has the count information f4 to f0, the sixth bit serves for parity checking. A pattern has a length b and a bit, the length a. A length ratio of b to a equal to six is allocated. The length of the indicating pulse, whether it is high H or low L, is defined by c and the length ratio of a to c equal to 3 is allocated.

Figure 3:
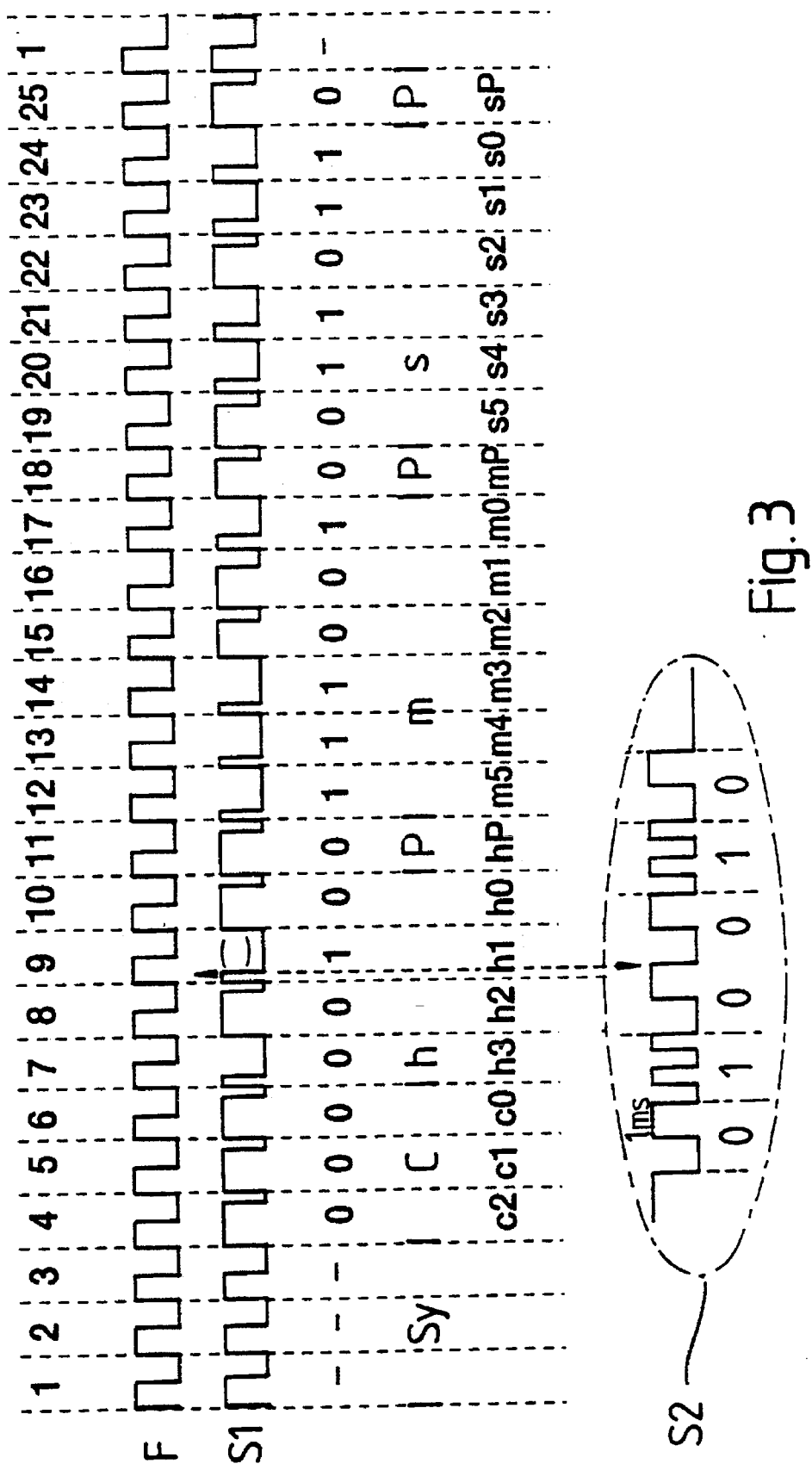
FIG. 3 shows the recorded track signals S1 and S2 according to a second inventive solution.

FIG. 3 shows the recording of the tracks S1 and S2 according to the second inventive solution. The track signal S1 is the same as the recorded track S1 in Solution 1. The track S1 is a low frequency signal and the track S2 is a high frequency signal. The low frequency signal of the track S1 serving as the base line signal is utilised such that for each falling edge of the track S1, a symmetrical sequence of 6 bits are symmetrically inserted or added about the edge. The added bits consist of one of two trains of oscillations having a pulse to pause ratio of 50%. This ensures that the amplitude reconstruction for positive and negative sequences of a bit is constant during a re-wind operation, which simplifies the evaluation or decoding. Here, the bit length for H, high bits and L, low bits is equal so that the length of the analysis window is constant for all of the bits. The maximum bit length results from the permissible displacement of the low frequency time code signal. A value of +/−3 mS will also enable a clean identification during the re-wind operation.

Figure 4:
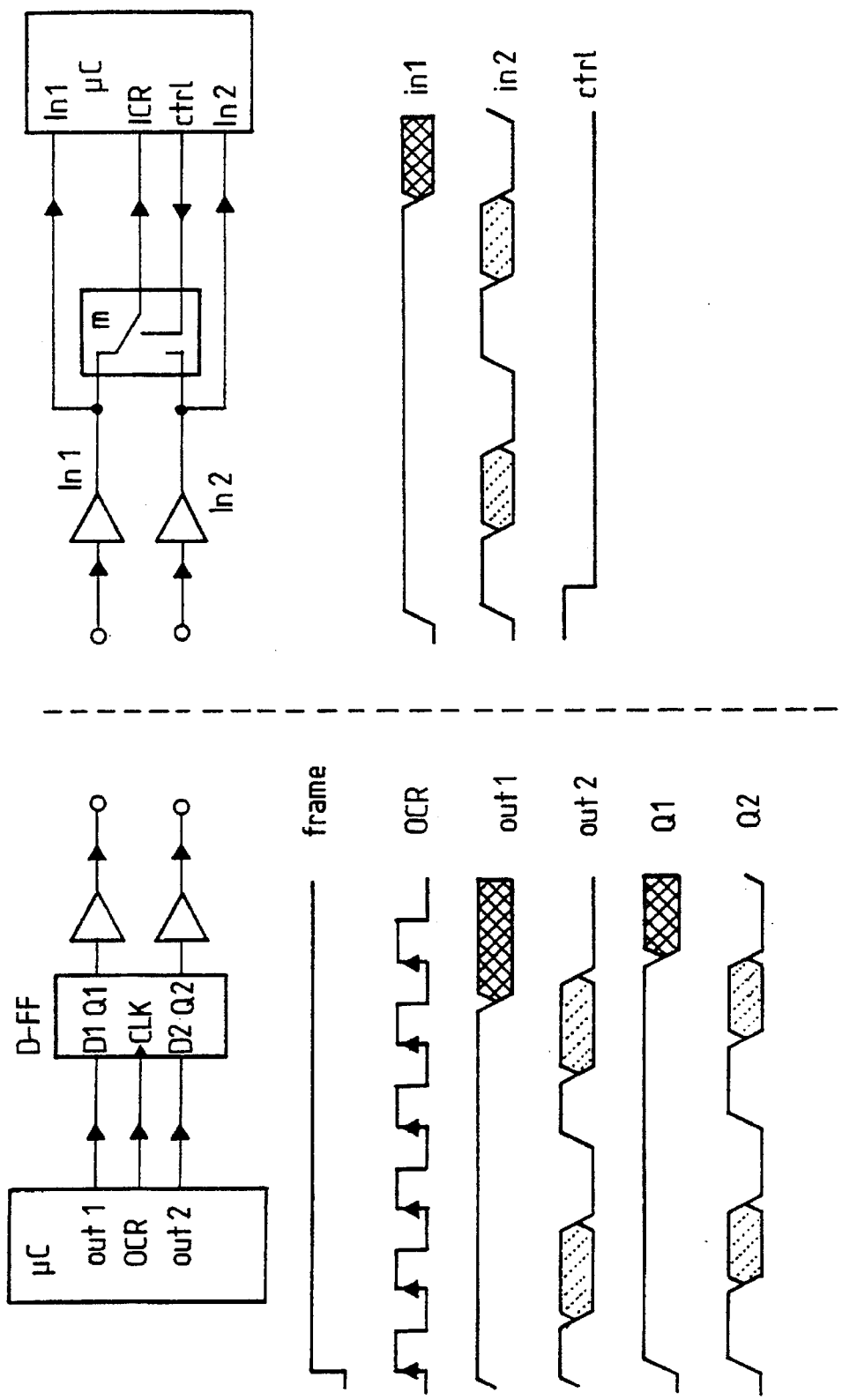
FIG. 4 is a block diagram showing the recording and regeneration of the signals.

FIG. 4 shows the main circuit for the recording and regeneration of the signals. The left hand side represents the generation of the signals. A microprocessor μC sets the logical states for the tracks S1 and S2 at out1 and out2 respectively and provides an accurate clock rate OCR. Out1 and out2 are synchronised with the clock rate in a succeeding D type flip flop and are available for the recording as S1 on Q1 and as S2 on Q2 respectively. The reproduction section is illustrated on the right hand half of FIG. 4. The rectangular signals in1 and in2 are available at the outputs of the amplifier. This is followed by a multiplexer which switches one of these signals onto the high resolution test input of a microprocessor μC in accordance with a predefined plan or control sequence, with the aid of the signal ctrl. This illustrated configuration may be used with a microprocessor μC having few high resolution test inputs ICR, capable of between input signal edge measurement with an accuracy of 250 nS, but which has a plurality of normal outputs available. If, on the other hand, two of these ICR inputs are available, then the leads in1 and in2 are to be connected directly to ICR1 and ICR2 respectively and the multiplexer together with the control lead ctrl can then be dispensed with. A multiplexing process in the form of a signal selection in the microprocessor is nevertheless possible.

Figure 5:
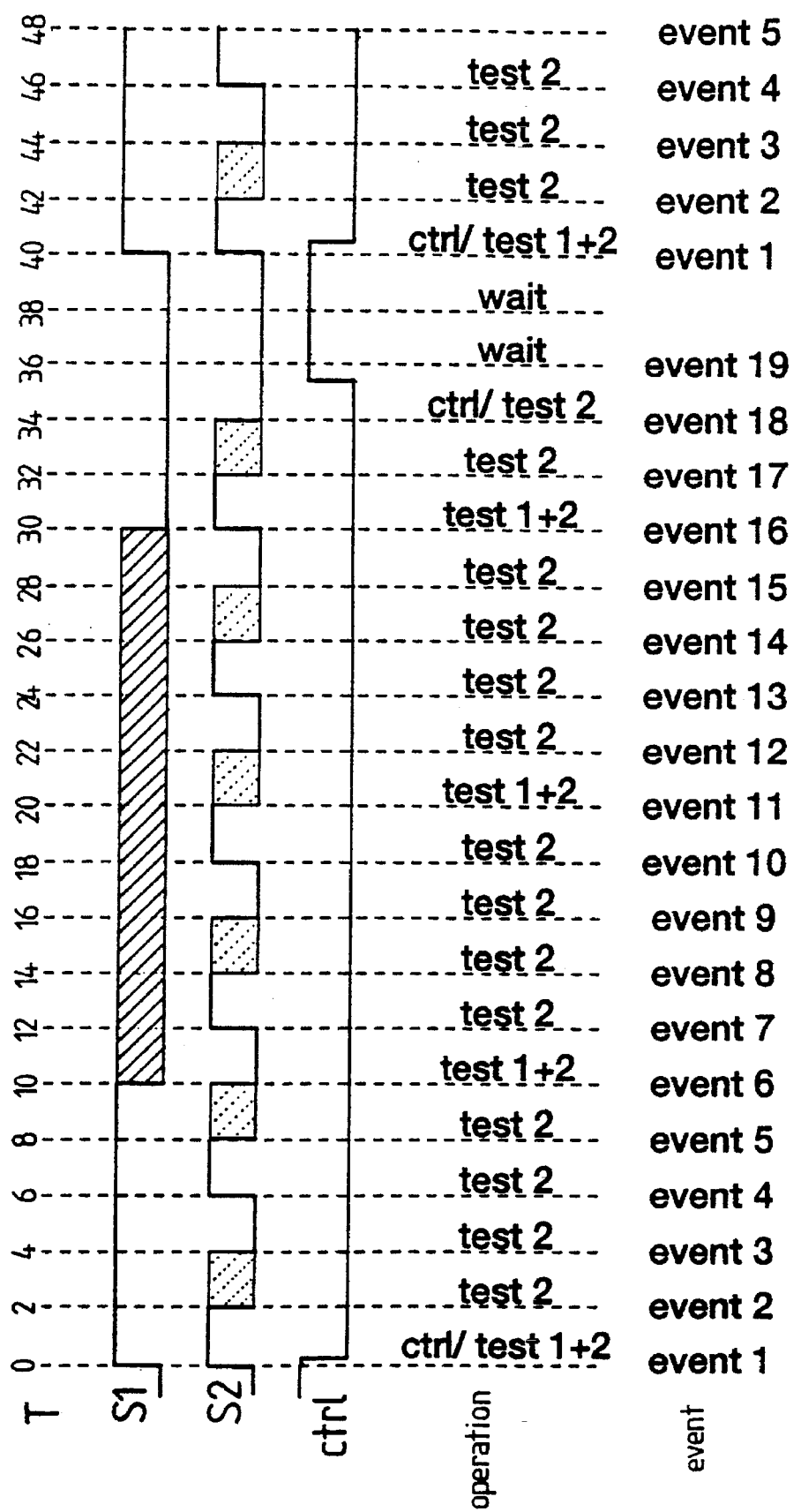
FIG. 5 shows an arrangement of the signals S1, S2.

In FIG. 5, the arrangement of the signals S1, S2 and ctrl over a time period of 48 mS is illustrated. The shaded regions represent the switch over points for H, high bits and L, low bits at their right and left hand boundaries respectively. Both signals are coupled to one another. In the time period T0, the evaluating or decoding system is awaiting a positive edge from S1 (ctrl1=H). If this event occurs, then there is a switch over to the second channel (ctrl1=L) and the state of S1 is interrogated. The next change in the signal, indicated by event 2 or event 3 in FIG. 5, is registered by the microprocessor and converted as described in the fields of the diagram. The entries (event 2, 3 as well as event 4, 5 and those following) represent possible signal change points but, in dependence on the logical state, there will only be either event 2 or event 3.

We claim:

1. A time and control code generator for video recording and replay use, said generator comprising:

a pulse generator generating a waveform of pulses having a television frame frequency repetition rate;

a source of a time code signal related to said television frame frequency repetition rate and comprising data bits representative of hours, minutes and seconds of time and data bits representative of frames;

pulse width modulating means responsive to said time representative data bits for moving trailing edges of said pulses to a first position when said time representative data bits have a first logical value and to a second position when said time representative data bits a have a second logical value; and, signal generating means responsive to said frame representative data bits and generating a signal having a first frequency when said frame representative data bits have said first logical value and having a second frequency when said frame representative data bits have said second logical value, said signals of said first and second frequencies being added to said width modulated signal to occur with symmetrical positions about said trailing edges of said width modulated pulses, said modulated positions of said trailing edges being undisturbed by said symmetrical positions.

2. The time and control code generator of claim 1, wherein said first logical value corresponds to a logical 1 and said second logical value corresponds to a logical 0.

3. The time and control code generator of claim 1, wherein said said second frequency signal is an integer multiple of said first frequency signal.

4. The time and control code generator of claim 1, wherein leading edges of said pulse waveform provides servo system synchronization.

5. The time and control code generator of claim 1, wherein said first and second frequencies each have pulse to pause ratios of about 50%.

6. The time and control code generator of claim 1, wherein said data representing frames comprises at least six bits.

7. The time and control code generator of claim 1, wherein said pulse having said trailing edge position modulation and including said first and second frequencies is recorded by a video recorder as a longitudinal record on a magnetic medium.

8. The time and control code generator of claim 7, wherein said video recorder replays at a first speed equal to a recording speed and reproduces said longitudinal record comprising said pulse leading and trailing edges, said pulse trailing edges representing said time code signal having data bits corresponding to hours, minutes, seconds and frames.

9. The time and control code generator of claim 8, wherein said video recorder replays at a second speed greater than said recording speed and reproduces said longitudinal record comprising said pulse leading and trailing edges, said pulse trailing edge representing said time code signal having data bits corresponding to hours, minutes and seconds.

10. A time and control code generator for video recording and replay use, said generator comprising:

a source of a time code signal related to a television frame frequency repetition rate and comprising data bits representative of hours, minutes and seconds of time and data bits representative of frames;

a pulse generator generating a pulse waveform having said television frame frequency repetition rate and a duty cycle modulated responsive to said data bits representative of hours, minutes and seconds of time, wherein data bits having a first logical value generate a first duty cycle and data bits having a second logical value generate a second duty cycle;

a signal generator for generating a first signal having a first frequency responsive to said frame representative data bits having said first logical value and generating a second signal having a second frequency responsive to said frame representative data bits having said second logical value; and, said first and second signals being multiplexed with said modulated duty cycle pulse such that said modulated duty cycle is not disturbed.

11. The apparatus of claim 10, wherein said first logical value corresponds to a logical 1 and said second logical value corresponds to a logical 0.

12. The apparatus of claim 10, wherein said second signal frequency is an integer multiple of said first signal frequency.

13. The apparatus of claim 12, wherein said first and second frequencies each have duty cycles of about 50%.

14. The apparatus of claim 10, wherein said first frequency and said second frequency each have equal pulse to pause ratios.

15. The apparatus of claim 10, wherein said duty cycle of said output signal is changed once each second.

* * * * *